United States Patent

Higaki

(10) Patent No.: US 8,233,790 B2
(45) Date of Patent: Jul. 31, 2012

(54) DATA RECORDING APPARATUS AND DIGITAL CAMERA

(75) Inventor: Riichi Higaki, Matsudo (JP)

(73) Assignee: Nikon Corporation, Tokyo (JP)

( * ) Notice: Subject to any disclaimer, the term of this patent is extended or adjusted under 35 U.S.C. 154(b) by 126 days.

(21) Appl. No.: 12/767,919

(22) Filed: Apr. 27, 2010

(65) Prior Publication Data

US 2010/0284680 A1 Nov. 11, 2010

(30) Foreign Application Priority Data

May 1, 2009 (JP) .................................. 2009-112285
Apr. 20, 2010 (JP) .................................. 2010-097252

(51) Int. Cl.
*G03B 17/24* (2006.01)

(52) U.S. Cl. ................. 396/321; 365/189.16; 348/231.9

(58) Field of Classification Search .................. 396/310, 396/321; 365/189.011, 189.16, 189.17, 203.03; 348/231.99, 231.8, 231.9
See application file for complete search history.

(56) References Cited

U.S. PATENT DOCUMENTS

| 6,927,794 B2* | 8/2005 | Kubo et al. ................ 348/231.8 |
| 7,612,807 B2 | 11/2009 | Morino |
| 2003/0095194 A1* | 5/2003 | Suzuki et al. ............ 348/231.99 |

FOREIGN PATENT DOCUMENTS

JP A-2006-86595 3/2006

* cited by examiner

*Primary Examiner* — Clayton E Laballe
*Assistant Examiner* — Autumn Parker
(74) *Attorney, Agent, or Firm* — Oliff & Berridge, PLC

(57) ABSTRACT

Provided is a control section that, when created data is set to be recorded in both a first memory card and a second memory card and an amount of empty space in a writing buffer memory is less than or equal to a predetermined value, performs control to record the created data in only the first memory card and erases, from the buffer memory, data that has been recorded in the first memory card; and a transmission control section that, while a transmission path for image files from the first memory card to the second memory card is open, transmits to the second memory card, from among pieces of image data recorded in the first memory card, image files that are not recorded in the second memory card. When a memory card with a low communication speed is used, the effective recording speed is not decreased.

5 Claims, 6 Drawing Sheets

DATA RECORDING APPARATUS AND DIGITAL CAMERA

BACKGROUND

1. Technical Field

The present invention relates to a data recording apparatus and a digital camera.

2. Related Art

Patent Document 1 discloses a communication apparatus provided to an image capturing apparatus. This communication apparatus can transmit to the outside, via a wireless LAN, a digital image stored in a recording medium of the image capturing apparatus or a digital image recorded by the image capturing apparatus.

Patent Document 1: Japanese Patent Application Publication No. 2006-086595

The communication apparatus provided to the data recording apparatus of a digital camera or the like has a structure that corresponds to a specific digital camera. Therefore, the communication apparatus can only be equipped on specific equipment having a specialized connection terminal or the like. One proposal involves providing a wireless communication section to a memory card that can be inserted into various types of digital cameras. As a result, a wireless communication function can be added to existing digital cameras.

However, when incorporating a wireless communication section and a flash memory in a memory card having standardized dimensions, it is difficult to improve the writing speed of the flash memory due to restrictions on the power supply and restrictions on the space in the memory card. Therefore, when a memory card with below average communication speed, such as a memory card having a wireless communication section, is inserted, the effective operating speed of the digital camera is limited by the speed of writing to the flash memory, and this causes problems such as increased time between image capturing.

SUMMARY

Therefore, it is an object of an aspect of the innovations herein to provide a data recording apparatus and a digital camera, which are capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, one exemplary data recording apparatus may comprise a buffer memory that temporarily records data; a first card slot and a second card slot into which can be inserted memory cards that have memories for storing data; a determining section that determines communication speeds of the memory cards inserted in the first card slot and the second card slot, and that sets the memory card determined to have a higher communication speed as a first memory card and sets the memory card determined to have a communication speed lower than that of the first memory card as a second memory card; a control section that, when created data is set to be recorded in both the first memory card and the second memory card and an amount of empty space in the buffer memory is less than or equal to a predetermined value, performs control to record the created data in only the first memory card and erases, from the buffer memory, data that has been recorded in the first memory card; and a transmission control section that, while a transmission path for image files from the first memory card to the second memory card is open, transmits to the second memory card, from among pieces of image data recorded in the first memory card, image files that are not recorded in the second memory card.

According to a second aspect related to the innovations herein, one exemplary digital camera may be a digital camera provided with the data recording apparatus described above.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
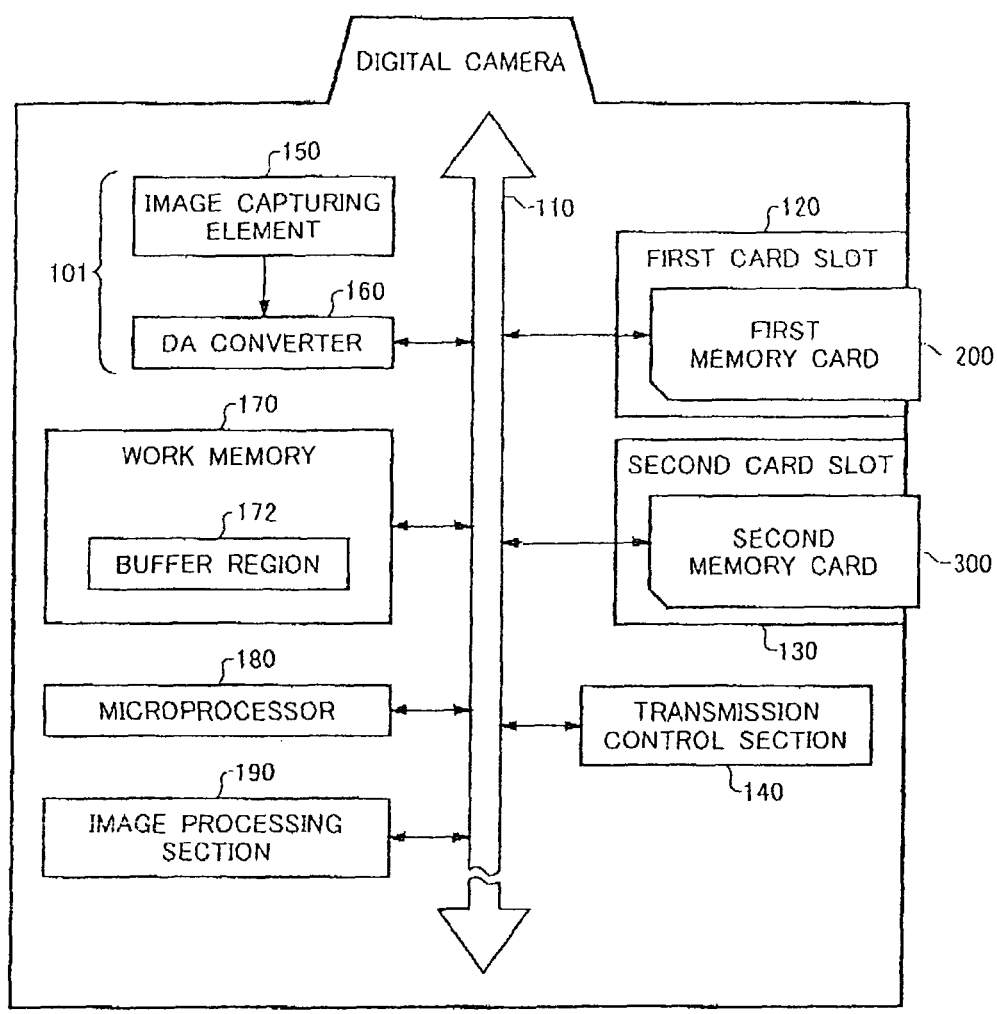
FIG. 1 is a block diagram showing a schematic view of a configuration of a digital camera 100.

FIG. 1 is a block diagram showing a schematic view of a configuration of a digital camera 100. The digital camera 100 includes an image capturing section 101, a first card slot 120, a second card slot 130, a transmission control section 140, a work memory 170, a microprocessor 180, and an image processing section 190 that are connected to each other via a data bus 110.

A first memory card 200 is removably inserted to the first card slot 120, and a second memory card 300 is removably inserted to the second card slot 130. The first memory card 200 and the second memory card 300 each have a non-volatile recording medium such as a flash memory. When the first memory card 200 or the second memory card 300 is inserted to the first card slot 120 or the second card slot 130, the inserted memory card is connected to the data bus 110.

The image capturing section 101 includes an image capturing element 150 and a DA converter 160. The image capturing element 150 is a photoelectric converter such as a CCD or C-MOS, and converts the captured image into an electric signal. The DA converter 160 encodes the electric signal resulting from the captured image conversion, thereby creating the image data. The image data is stored in a buffer region 172 designated in the work memory 170.

In the work memory 170, the image data undergoes various types of image processing such as noise elimination, exposure correction, distortion correction, and the like. The image data is converted, along with other data such as a date and image capturing conditions, into a file format that can be stored in the recording medium, thereby creating image files that correspond respectively to captured images.

Each image file is transmitted to and stored in at least one of the first memory card 200 and the second memory card 300. The image files stored in the recording medium in this way are sequentially deleted from the buffer region 172.

The microprocessor 180 controls the series of processes described above. The microprocessor 180 also performs processing for other operations of the digital camera 100, such as the mechanical operations relating to the shutter and diaphragm and the generation of a display image on a display section or the like. Image processing with a large load, however, is performed by the image processing section 190.

In the present embodiment, when a memory card is inserted into the first card slot 120 or the second card slot 130, the microprocessor 180 communicates with this memory card to acquire memory card information, such as communication speed information or a memory card ID, in order to determine the type of the inserted memory card.

The microprocessor 180 then identifies the memory card that has a low communication speed, e.g. a reading speed and/or writing speed, based on the memory card information acquired from the memory card. When the microprocessor 180 determines that the connected memory card is a specialized memory card such as a memory card with a wireless function, based on the memory card ID, the microprocessor 180 determines that this memory card is a low-speed memory card relative to a memory card that was determines to be normal.

The microprocessor 180 may identify a memory card with a low communication speed by a comparison with the communication speed information acquired at the time of connection. Instead, the microprocessor 180 may perform this identification by actually writing a prescribed amount of data at the communication speed of the memory card. Furthermore, when the specifications of the memory card corresponding to the first card slot 120 are different from those of the memory card corresponding to the second card slot 130 and the communication speeds according to these specifications are also different, the microprocessor 180 may determine which of the first memory card 200 and the second memory card 300 has a high communication speed and which has a low communication speed, based on which memory card is inserted in which card slot.

The following describes an example in which the second memory card 300 is determined to have a high communication speed and the first memory card 200 is determined to have a low communication speed.

The transmission control section 140 controls transmission of the image files generated as described above to the first memory card 200 and the second memory card. Furthermore, as described further below, the transmission control section 140 controls the transmission of the image files from the first memory card 200 to the second memory card 300. The transmission control section 140 may be realized by a specialized device, or may be implemented as a portion of the functions of the microprocessor 180. The control performed by the transmission control section 140 is described further below.

Figure 2:
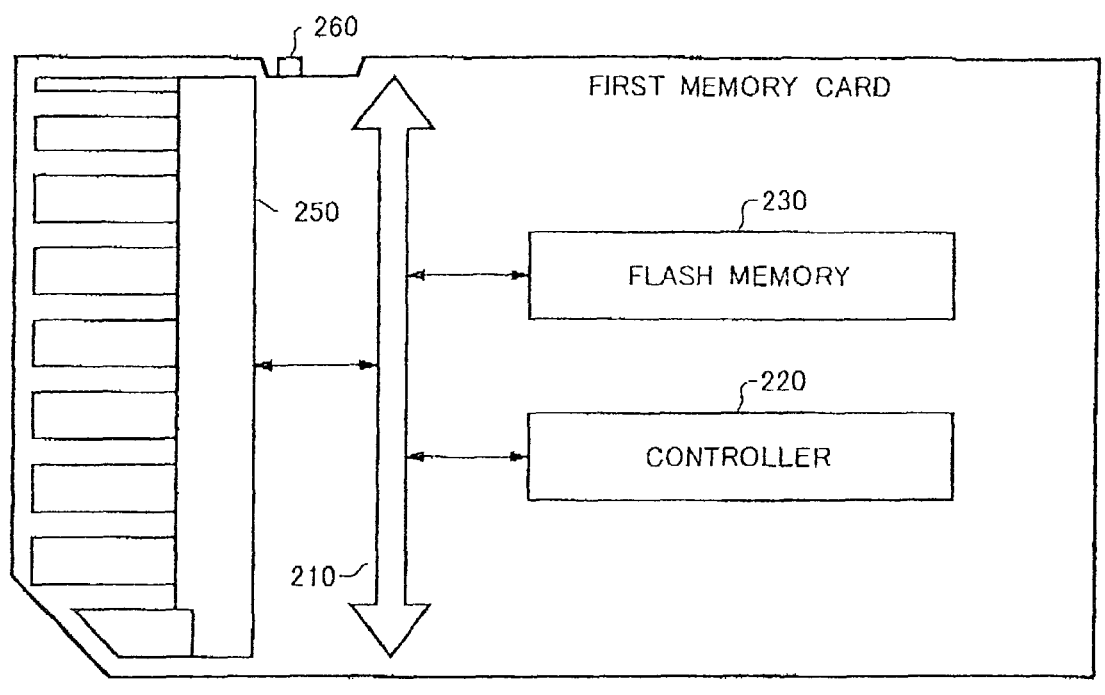
FIG. 2 is a block diagram showing a schematic view of a configuration of the first memory card 200.

FIG. 2 is a block diagram showing a schematic view of a configuration of the first memory card 200. The first memory card 200 includes an internal bus 210, a controller 220, a flash memory 230, a connection terminal 250, and a protect switch 260.

The internal bus 210 connects the controller 220, the flash memory 230, and the connection terminal 250 to each other. The connection terminal 250 is arranged according to the specifications of the first card slot 120, and when the first memory card 200 is inserted into the first card slot 120, electrically connects to the internal bus 210 to the data bus 110 of the digital camera 100 via the first card slot 120.

The flash memory 230 is a non-volatile recording medium and stores image files transmitted from the digital camera 100. When the first memory card 200 is removed from the first card slot 120, the flash memory 230 of the first memory card 200 continues to hold the stored image files. In addition to adjusting the internal bus 210 and communicating with the digital camera 100, the controller 220 also performs functions such as writing to and reading from the flash memory 230, erasing blocks, and wear leveling. When activated, the protect switch 260 prohibits writing to the flash memory 230 and erasing of blocks in the flash memory 230.

The first memory card 200 is formed to have a shape corresponding to the standard of the first card slot 120. Specifically, the first memory card 200 and the first card slot 120 have the same mechanical specifications such as the dimensions of the card, the member of connection terminals, and the arrangement of the connection terminals, electrical specifications such as logic voltage and power consumption, and data specifications such as file systems and protocols.

There are various standards for the second memory card 300, such as SD (Secure Digital), SDHC (SD High Capacity), and CF (Compact Flash) standards. The first memory card 200 can be inserted into a card slot with a different standard by using an adapter or the like.

Figure 3:
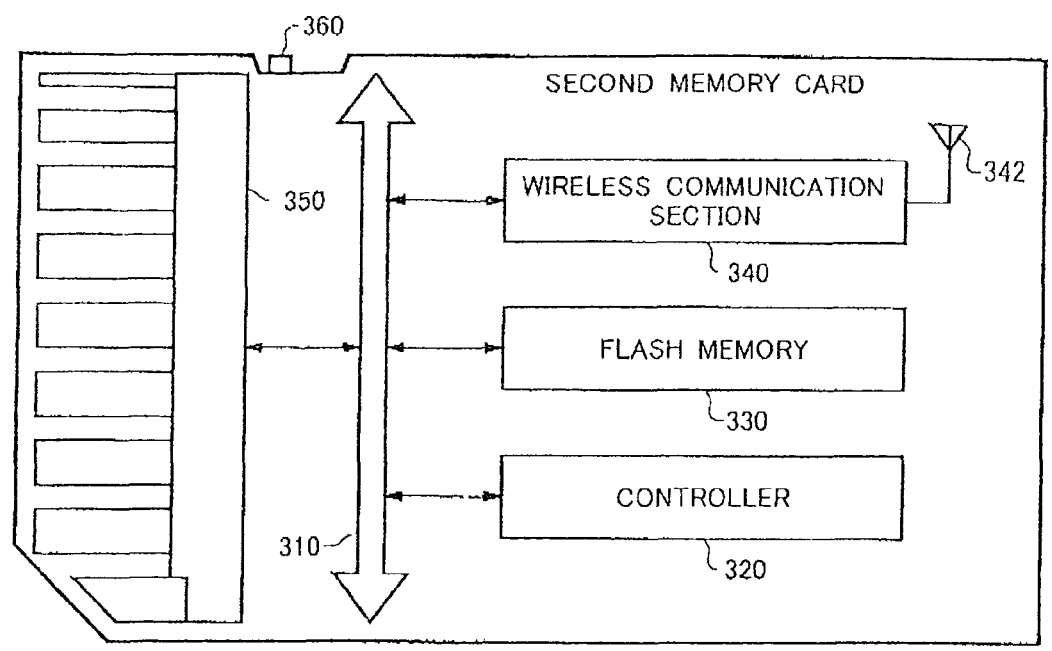
FIG. 3 is a block diagram showing a schematic view of a configuration of the second memory card 300.

FIG. 3 is a block diagram showing a schematic view of a configuration of the second memory card 300. The second memory card 300 includes an internal bus 310, a controller 320, a flash memory 330, a wireless communication section 340, a connection terminal 350, and a protect switch 360.

The present embodiment describes an example in which the second memory card 300 is determined to have a lower communication speed than the first memory card, and has a wireless function. However, the second memory card 300 need not include the wireless communication section 340, and may instead be inserted into the second card slot 130 without using a wireless function.

The second memory card 300 is similar to the first memory card 200 in that both memory cards include a controller 320, a flash memory 330, a connection terminal 350, and a protect switch 360. In other words, when the second memory card 300 is inserted into the second card slot 130, the internal bus 310 of the second memory card 300 is connected to the data bus 110 of the digital camera 100, and the image files are stored in the flash memory 330 under the control of the controller 320. Therefore, from the viewpoint of the digital camera 100, the second memory card 300 is a recording medium connected to the data bus 110, in the same way as the first memory card 200.

The second memory card 300 includes the wireless communication section 340. The wireless communication section 340 has a function for transmitting the image files stored in the flash memory 330 to the outside as a wireless signal, via an antenna 342. Therefore, the controller 320 transmits the image files stored in the flash memory 330 to an external file server or the like via the wireless communication section 340. This operation by the wireless communication section 340 is controlled exclusively by the controller 320, and so from the outside, the second memory card 300 itself appears to be transmitting the image files.

The controller 320 has a different function than the controller 220 of the first memory card 200 with regard to the control of the wireless communication section 340. The wireless communication section 340 is used only for the transmission of the image files. However, when establishing a handshake with the destination of the image file transmission, for example, the wireless communication section 340 has a function to receive a wireless signal.

The second memory card 300 has specifications that correspond to the specific standard of the second card slot 130. Specifically, the mechanical specifications, electric specifications, and data specifications of the second memory card 300 are the same as those of the second card slot 130.

One example of the second memory card 300 provided with the wireless communication section 340 is the commercially-available Eye-Fi card (a product of Eye-Fi, US), which is an SD memory card having a TCP/IP wireless communication function.

As described above, the second memory card 300 is seen as a recording medium from the viewpoint of the digital camera 100. Therefore, when the first card slot 120 and the second card slot 130 have the same specifications, the first memory card 200 can be inserted into the second card slot 130 and the second memory card 300 can be inserted into the first card slot 120.

On the other hand, the first card slot 120 and the second card slot 130 need not have the same standards, and the first memory card 200 operating as the recording medium may be housed in the digital camera 100. Furthermore, the recording medium is not limited to being a flash memory, and may be another type of medium such as a hard disk drive.

The operation of the wireless communication section 340 is controlled exclusively by the controller 320, but in response to a request from the microprocessor 180 or the transmission control section 140, the wireless communication section 340 may enable the second memory card 300 to reference information in the digital camera 100 for identifying image files that have been transmitted.

The second memory card 300 of the present embodiment includes the flash memory 330 and the wireless communication section 340. Therefore, writing to the flash memory 330 and communication with the wireless communication section 340 are performed within a power consumption range determined by the SD card standard. Accordingly, the power that can be used for the operation of the flash memory 330 is limited, and so the effective writing speed of the flash memory 330 is lower than that of the flash memory 230 in the first memory card 200.

Furthermore, the dimensions of the card are determined by the SD card standard. Therefore, in order to increase the capacity of the flash memory 330 stored together with the wireless communication section 340 in a prescribed space, the flash memory 330 may be a multi-level cell memory chip.

A multi-level cell flash memory with good capacity has a lower writing speed than a single-level cell flash memory, and this is another reason why the writing speed of the flash memory 330 is lower than that of the flash memory 230 in the first memory card 200.

On the other hand, the writing speed to the buffer region 172 is faster than the writing speeds to both the flash memories 230 and 330. Therefore, by writing the image files of the captured images to the buffer region 172, the digital camera 100 can capture subsequent images at short intervals.

Figure 4:
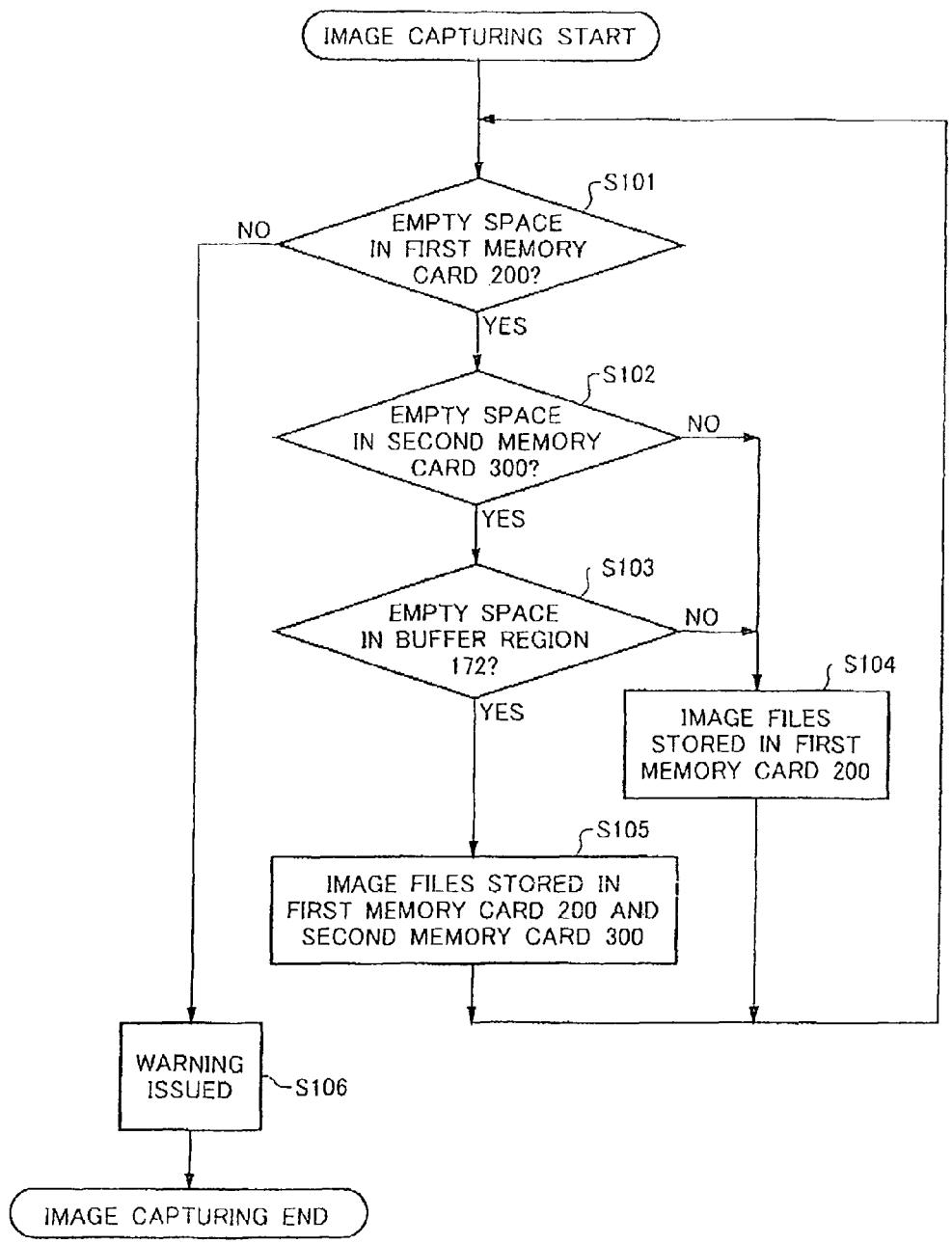
FIG. 4 is a flowchart describing the control performed by the transmission control section 140.

FIG. 4 is a flowchart describing the control performed by the transmission control section 140 for transmitting the image files. The control shown here relates to transmitting image files from the buffer region 172 to the recording medium.

When the digital camera 100 begins image capturing and the image files are generated in the buffer region 172, the transmission control section 140 checks whether there is empty space in the flash memory 230 of the first memory card 200 (S101). If there is enough empty space in the flash memory 230 to store the image files (the "YES" of S101), the transmission control section 140 checks whether there is enough empty space to store the image files in the flash memory 330 of the second memory card 300 (S102).

If there is enough empty space in the flash memory 330 of the second memory card 300 to store the image files (the "YES" of S102), the transmission control section 140 checks whether there is the prescribed empty space in the buffer region 172 (S103). If there is the prescribed empty space in the buffer region 172 (the "YES" of S103), the transmission control section 140 records the image files generated in the buffer region 172 in both the flash memory 230 and the flash memory 330 (S105). Flags may be provided to the image files written to the flash memory 230 of the first memory card 200, and these flags may be set when these image files are written to the flash memory 330.

By recording the image files on both the flash memory 230 and the flash memory 330 in this way, the transmission of the image files from the first memory card 200 to the second memory card 300 can be omitted. However, the time necessary for the image files to be recorded to the flash memories 230 and 330 from the buffer region 172 is determined by the writing speed to the flash memory of the slower memory card, which is the flash memory 330 of the second memory card 300 in the present embodiment.

In the above series of processes, when there is not enough empty space in the flash memory 230 of the first memory card 200 to write the image files (the "NO" of S101), the transmission control section 140 notifies the microprocessor 180 that image files of captured images cannot be saved, and issues a warning to the user (S106). As a result, the image capturing by the digital camera 100 is finished.

It is possible that, for some reason, the second memory card 300 may have empty space while the first memory card 200 does not. In such a case, imaging capturing can continue by recording image files in the flash memory 330 of the second memory card 300. However, as described further below, when it is preferable that all of the captured image files be stored on the first memory card 200, the image capturing is preferably ended regardless of whether there is empty space on the second memory card 300.

In the above series of processes, when there is not enough empty space in the flash memory 330 of the second memory card 300 (the "NO" of S102), the image capturing can continue by recording image files in the flash memory 230 of the first memory card 200 (S104). Specifically, it goes without saying that more image files cannot be held in the flash memory 330 when there is no empty space left, but image capturing by the digital camera 100 can continue by sequentially storing the image files in the flash memory 230 of the first memory card 200.

In the above series of processes, when the prescribed empty space does not remain in the buffer region 172 (the "NO" of S103), the image data that has already been recorded on the first memory card is erased from among the image data recorded in the buffer region 172, and the image files are stored in the flash memory 230 of the first memory card 200 regardless of the empty space in the flash memory 330 of the second memory card 300 (S104), thereby allowing image capturing to continue. Specifically, the writing speed of the image data to the buffer region 172 is higher than the writing speed of the image files to the flash memories 230 and 330. Therefore, when a plurality of images are captured in series by the digital camera 100, the number of image files remaining in the buffer region 172 gradually increases, and eventually there is no more empty space in the buffer region 172. The "prescribed empty space" mentioned above may refer to an amount of space sufficient for recording a single image file, or may refer to an amount of space sufficient for recording image data of one to five images.

In this case, further image files cannot be captured until enough image files in the buffer region 172 are transferred to the flash memory 230 and 330 that an empty space is created in the buffer region 172. In other words, when there is no empty space in the buffer region 172, the interval between image capturing by the digital camera 100 depends on the writing speeds to the flash memory 230 and 330.

As described above, the flash memory 330 of the second memory card 300 is determined to have a lower writing speed than the flash memory 230 of the first memory card 200. Therefore, when the remaining space of the buffer region 172 is less than or equal to the prescribed space, the effective interval between image capturing can be shortened by continuing the image capturing while writing the image files to first memory card, whose flash memory 230 has the higher writing speed.

When the image files need to be recorded at high speeds in this way, the transmission control section 140 may record the image files to the first memory card 200 instead of recording the image files in parallel to the first memory card 200 and the second memory card, even though there is a setting to record the image files to both the first and second memory cards. Here, the "prescribed space" refers to refers to a space that is too small to record one piece of image data or a prescribed number of pieces of image data.

Figure 5:
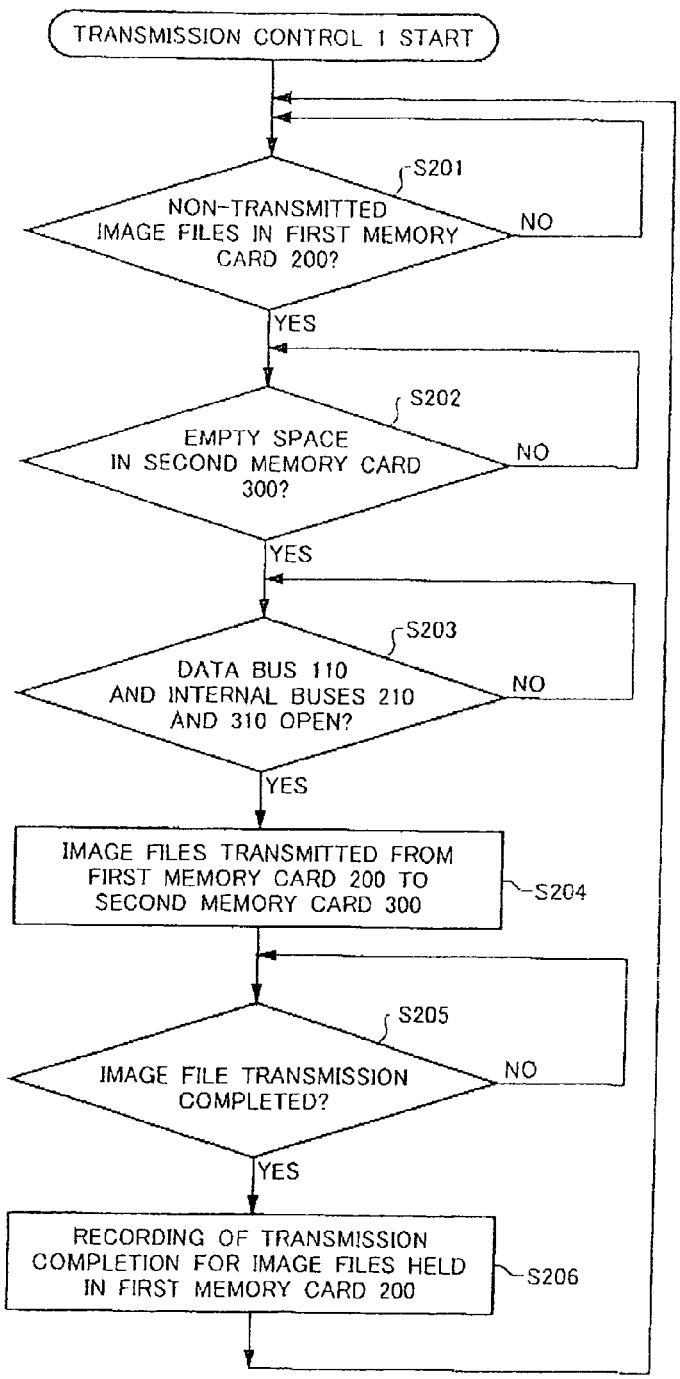
FIG. 5 is a flow chart describing transmission control 1 performed by the transmission control section 140 for transmitting image files.

FIG. 5 is a flow chart describing the control performed by the transmission control section 140 for transmitting image files. The control shown here relates to transmitting image files from the first memory card 200 to the second memory card 300.

While the digital camera 100 is operating, the transmission control section 140 monitors the flash memory 230 of the first memory card 200 to check if the flash memory 230 contains image files that are not stored in the flash memory 330 of the second memory card 300 (S201).

Here, for image files that are written from the buffer region 172 to both the first memory card 200 and the second memory card 300 (S105 of FIG. 4), these image files are all recorded in the flash memory 330 of the second memory card 300. In this case, the flags provided to the image files written to the first memory card 200 may all be set.

For image files that are written from the buffer region 172 to only the first memory card 200 (S104 of FIG. 4), flags provided to these image files indicating whether the image files are stored in the second memory card 300 are checked.

If image files that are not stored in the flash memory 330 of the second memory card 300 are present in the flash memory 230 of the first memory card 200 (the "NO" of S201), the transmission control section 140 continues the monitoring (S201). The determination that each image file is not stored in the flash memory 330 can be made based on the flag for each image file being set.

When there is an image file whose flag is not set, it is determined that this image file is not stored in the flash memory 330 of the second memory card 300 (the "YES" of S201). Then, the transmission control section 140 checks whether there is enough remaining space in the flash memory 330 of the second memory card 300 to store this image file (S202).

When there is not enough empty space in the flash memory 330 of the second memory card 300 to store the image file (the "NO" of S202), the transmission control section 140 continues to monitor the flash memory 330 until there is enough open space (S202). When there is enough open space in the flash memory 330, the transmission control section 140 checks whether the data bus 110, which is the transmission path used when transmitting the image file from the first memory card 200 to the second memory card 300, is open (S203). At the same time, the transmission control section 140 can check whether the internal bus 210 and 310 of the first memory card 200 and the second memory card 300 are open.

If the data bus 110 and the internal buses 210 and 310 are not open (the "NO" of S203), the microprocessor 180 and the controllers 220 and 320 issue bus requests and continue the monitoring (S203). If the data bus 110 and the internal buses 210 and 310 are open (the "YES" of S203), transmission of the image files from the flash memory 230 to the flash memory 330 is begun (S204). This transmission involves copying the files from the first memory card to the second memory card, and so the transmitted files remain in the flash memory 230 of the first memory card 200.

The transmission control section 140 monitors whether transmission of the image files is finished (S205). The monitoring continues while the transmission continues (the "NO" of S205), and when the transmission is finished (the "YES" of S205), a flag is set for each of the original image files remaining in the flash memory 230 of the first memory card 200, indicating that transmission of this original image is finished (S206). In this way, when transmission of a single image file is finished, the transmission control section 140 again monitors whether there is an image file that has yet to be transmitted to the first memory card 200 (S201).

According to the control flow described above, the image files generated by the image capturing of the digital camera 100 are stored in the flash memory 330 of the second memory card 300, although not necessarily at the same time that these image files are stored in the first memory card 200. However, with the control performed by the transmission control section 140 described in FIG. 4, the limitation on the image capturing intervals of the digital camera 100 due to the writing speed of the flash memory 330 can be avoided.

Figure 6:
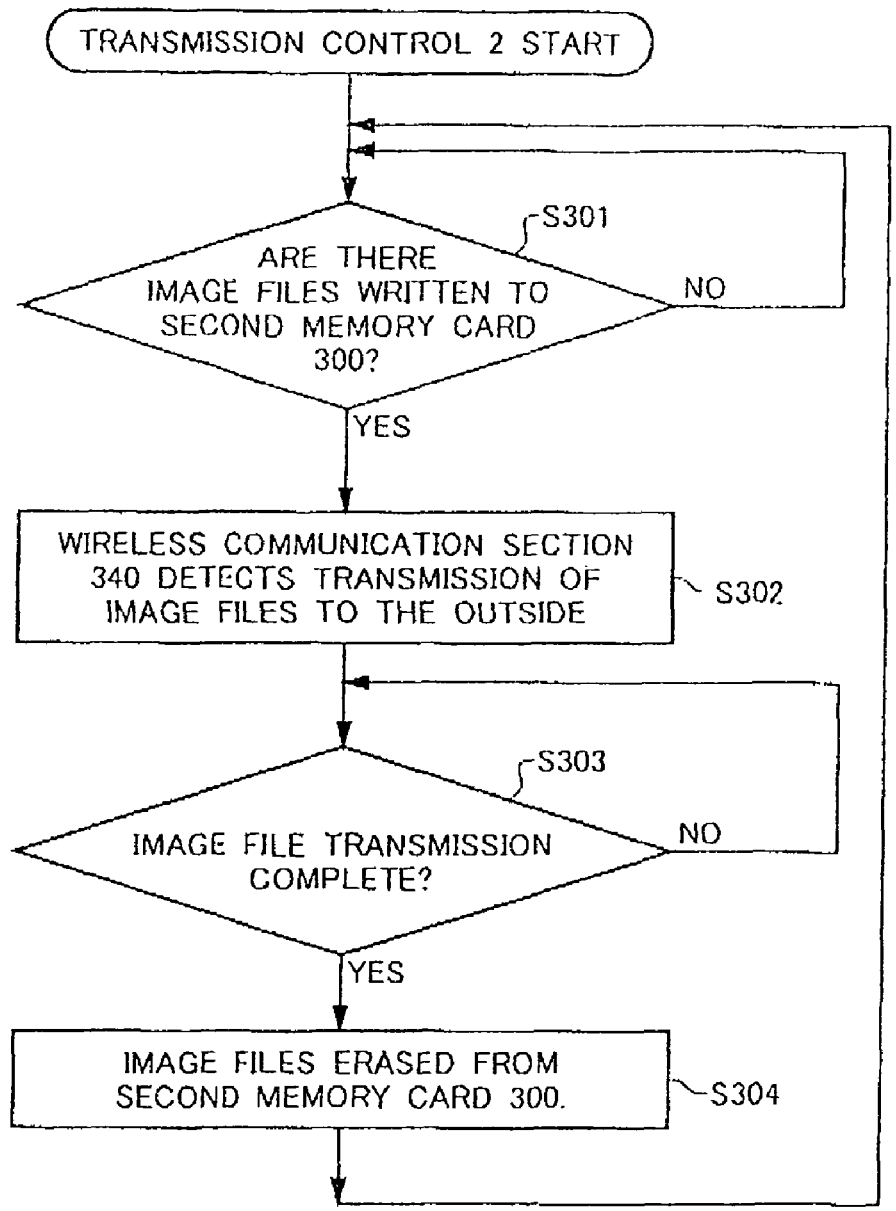
FIG. 6 is a flow chart describing transmission control 2 performed by the transmission control section 140 for transmitting image files.

FIG. 6 is a flowchart of the control performed by the transmission control section 140 for transmitting the image files when the second memory card, which has a low communication speed, has a function for wireless communication. The control shown here (transmission control 2) relates to the handling of image files in the flash memory 330 of the second memory card 300.

As described above, in the present embodiment, when the a memory card having a wireless communication function is used as the second memory card 300 having a communication speed lower than that of the first memory card, the controller 320 of the second memory card 300 controls the wireless communication section 340 to transmit the image files stored in the flash memory 330 to the outside. Here, the "outside" may refer to a file server, a personal computer, or the like connected to the wireless communication section 340 via a wireless network.

While the digital camera 100 is operating, the transmission control section 140 monitors whether there are image files written to the flash memory 330 of the second memory card 300 (S301). When there are no image files written to the flash memory 330 (the "NO" of S301), the transmission control section 140 continues monitoring (S301).

When there is an image file written to the flash memory 330 (the "YES" of S301), the transmission control section 140 detects whether this image file is an image file that is sent to the outside by the wireless communication section 340 (S302). The transmission control section 140 also monitors whether the transmission of the files being monitored is finished (S303), and continues monitoring until the transmission is finished (the "NO" of S303).

When transmission of the image files is finished (the "YES" of S303), the transmission control section 140 erases these files from the flash memory 330 of the second memory card 300. Therefore, empty space is created in the flash memory 330 of the second memory card 300, thereby resulting in the state of step S202 in transmission control 1 shown in FIG. 5.

In this way, the image files stored in the flash memory 330 of the second memory card 300 are sequentially erased after being transmitted to the outside. Therefore, the image files stored in the flash memory 330 are saved in the external transmission destination, and do not remain in the digital camera 100.

Accordingly, regardless of whether there is no empty space in the flash memory 230 of the first memory card 200, when there is empty space in the flash memory 330 of the second memory card 300, it is undesirable for the image files to be saved in the second memory card without being saved in the first memory card. If image files are saved in the second memory card without being saved in the first memory card, it is desirable that the erasure of the image files transmitted to the outside (S304) not be performed.

The series of processes shown in FIGS. 4 to 6 are performed after the user initiates image capturing. Therefore, the user might turn off the power during processing. In such a case, the processing may be stopped after recording a position in the processing to be resumed when the power is turned on again, and the power may then be turned off in response to the user pressing the power switch. Instead, the current to be supplied to the transmission control section 140 for the processing may be detected, and the power supply may continue until the processing is finished.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

For example, the format of the data recorded on the memory cards in the above description is image data, but this data may instead be audio data, text data, or the like. Furthermore, a digital camera is used as an example of the data recording apparatus that records the data onto the memory cards, but the present invention can also be applied to other data recording apparatuses such as an audio recorder or a personal computer.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A data recording apparatus comprising:
   a buffer memory that temporarily records data;
   a first card slot and a second card slot into which can be inserted memory cards that have memories for storing data;
   a determining section that determines communication speeds of the memory cards inserted in the first card slot and the second card slot, and that sets the memory card determined to have a higher communication speed as a first memory card and sets the memory card determined to have a communication speed lower than that of the first memory card as a second memory card;
   a control section that, when created data is set to be recorded in both the first memory card and the second memory card and an amount of empty space in the buffer memory is less than or equal to a predetermined value, performs control to record the created data in only the first memory card and erases, from the buffer memory, data that has been recorded in the first memory card; and
   a transmission control section that, while a transmission path for image files from the first memory card to the second memory card is open, transmits to the second memory card, from among pieces of image data recorded in the first memory card, image files that are not recorded in the second memory card.

2. The data recording apparatus according to claim 1, wherein
   when the second memory card includes a wireless transmission section, the control section erases, from the second memory card, data that has been transmitted outside by the wireless transmission section.

3. The data recording apparatus according to claim 1, wherein
   the data is image data.

4. A digital camera provided with the data recording apparatus of claim 1.

5. A computer readable medium storing thereon a program that causes a computer to function as the data recording apparatus of claim 1.

* * * * *